United States Patent
Gauthier et al.

(10) Patent No.: US 7,211,706 B2
(45) Date of Patent: May 1, 2007

(54) PROCESS FOR RECOVERING HYDROGEN IN A GASEOUS HYDROCARBON EFFLUENT USING A MEMBRANE REACTOR

(75) Inventors: Thierry Gauthier, Brignais (FR); Christophe Chau, Rueil Malmaison (FR); Denis Uzio, Marly le Roi (FR); Isabelle Prevost, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 706 days.

(21) Appl. No.: 10/211,233

(22) Filed: Aug. 5, 2002

(65) Prior Publication Data

US 2003/0083534 A1 May 1, 2003

(30) Foreign Application Priority Data

Aug. 3, 2001 (FR) .................... 01 10481

(51) Int. Cl.
*C07C 7/144* (2006.01)
*B01D 53/22* (2006.01)

(52) U.S. Cl. .................... 585/818; 95/55

(58) Field of Classification Search ........... 585/818; 95/55
See application file for complete search history.

(56) References Cited

U.S. PATENT DOCUMENTS 3,966,834 A * 6/1976 Perry et al. .................. 585/818
4,388,479 A   6/1983 Gryaznov et al.
6,165,350 A * 12/2000 Lokhandwala et al. ..... 208/103
6,171,472 B1 * 1/2001 Lokhandwala et al. ..... 208/103
6,179,996 B1 * 1/2001 Baker et al. ................ 208/103
6,190,536 B1 * 2/2001 Lokhandwala et al. ..... 208/103
6,410,811 B2 * 6/2002 Chau et al. .................. 585/259

FOREIGN PATENT DOCUMENTS

GB    2 068 938      * 8/1981
WO    99/45035        9/1999
WO    00/32512        6/2000

OTHER PUBLICATIONS

Patent Abstract of Japan, Publication No. 07197053, Publication Date Aug. 1, 1995, Applicant: Mitsubishi Kakoki Kaisha Ltd., Title: Production of City Gas.

* cited by examiner

*Primary Examiner*—Glenn Caldarola
*Assistant Examiner*—In Suk Bullock
(74) *Attorney, Agent, or Firm*—Millen, White, Zelano & Branigan, P.C.

(57) ABSTRACT

In order to recover hydrogen from a hydrogen-rich gaseous effluent, a procedure is used that comprises:
  in a stage (a), bringing a hydrocarbon-rich gaseous effluent into contact with the upstream face of a hydrogen-selective membrane at a pressure P1;
  in a stage (b), bringing a flow containing one or more unsaturated compound(s) into contact with the downstream face of a membrane at a pressure P2, which is smaller than P1, in the presence of a catalyst, to hydrogenate at least a portion of the unsaturated compound(s) using at least a portion of the hydrogen that passes by permeation through the upstream face to the downstream face of the selective membrane; and
  in a stage (c), transporting a flow containing the hydrogenated compound(s) into stage (b).

26 Claims, 1 Drawing Sheet

PROCESS FOR RECOVERING HYDROGEN IN A GASEOUS HYDROCARBON EFFLUENT USING A MEMBRANE REACTOR

BACKGROUND OF THE INVENTION

FIELD OF THE INVENTION

The object of this invention is to propose a process for recovering hydrogen in a hydrocarbon-rich gaseous effluent.

The invention pertains more specifically to a process that ensures the permeation of the hydrogen that is to be recovered through a hydrogen-selective membrane, followed by the hydrogenation of at least one unsaturated compound contained in a flow that circulates in contact with the phase downstream from the membrane (for example, at least one hydrocarbon) in order to promote permeation flows through the membrane by virtue of the instantaneous consumption of hydrogen, the transport of the hydrogen contained in the unsaturated compound that is hydrogenated in this way, and the dehydrogenation of the hydrogenated compound, thus making it possible to recover the hydrogen that is separated by the selective membrane.

The process of the invention generally pertains to the recovery of hydrogen in feedstocks that consist of all gaseous effluents that contain non-negligible amounts of hydrogen, such as the dry-gas fractions that are produced by processes such as fluidized-bed catalytic cracking (FCC in English, "Fluid Catalytic Cracking"), steam reforming, catalytic reforming, gasification, partial oxidation, the autothermal process that combines reforming and partial oxidation, or coking and visbreaking.

More specifically, the invention pertains to recovering the hydrogen that is produced during fluidized-bed catalytic cracking of heavy hydrocarbon fractions.

It is known that FCC is a conversion process that is fed with heavy hydrocarbon fractions, whose boiling point typically exceeds 360° C. at atmospheric pressure. The feedstock is vaporized upon contact with the hot catalyst (fine particles whose mean diameter is generally between 50 and 100 μm and whose grain density is generally between 1000 and 2000 kg/m$^3$, consisting essentially of silica and alumina) and reacts in an elongated, essentially tubular reactor at reactor outlet temperatures of generally between 480 and 700° C., typically on the order of 500–580° C., over a period of between 50 ms and 10 seconds, typically between 1 and 5 seconds, whereby the ratio between the mass flow of catalyst and that of the feedstock is generally between 3 and 20, typically between 5 and 8. At the outlet from the tubular reactor, the gaseous effluents are separated from the catalyst particles. The catalyst particles, which contain the carbon deposit (coke) that is formed during the reaction, are sent to a continuous regeneration chamber, where the coke burns and thus heats the catalyst in order to provide the heat that is necessary to vaporize the feedstock and to support the cracking reactions. The feedstock molecules are transformed by the cracking reactions into lighter molecules. It is thus possible to obtain 20–90% by weight of molecules whose boiling point is less than 360° C., more typically 50 to 75%. The gaseous molecules from the reactor are evacuated from the reaction zone after the catalyst particles are separated and go to a fractionation-purification zone that is designed to apportion the cracking products into fractions that feed the various product pools of the refinery. The first stage in fractionation consists in carrying out distillation at a pressure that is as close as possible to atmospheric pressure. With distillation it is possible to separate the slightly cracked heavy fractions (which boil at temperatures that typically exceed 300–380° C. at the bottom of the column). The intermediate fractions (which boil at temperatures typically between 100–200° C. and 300–380° C.) are drawn off laterally from the distillation column. At the top of the column, the light products (light gasoline, liquefied petroleum gas LPG, ethane, ethylene, water, hydrogen, $H_2S$, CO, $CO_2$, COS, etc.) pass through a condensation stage at a temperature of between 30 and 100° C., typically close to 30–60° C., in order in particular to separate the water from the gaseous products at near-atmospheric pressure, typically less than 0.2 MPa (absolute). The condensed products are generally refluxed back to the column, as regards the less dense hydrocarbons, and to acid-water treatment for the essentially aqueous liquid phase. The non-condensed products are generally compressed by one or more compression stages to approximately 1–2 MPa (absolute).

One or more absorption stages, followed by washing by contact with liquid hydrocarbon fractions and basic aqueous solutions such as amines, make it possible gradually to eliminate the bulk of the hydrocarbons that contain more than 2 carbon atoms and the traces of water and $H_2S$.

After the various products resulting from the cracking reactions are separated and purified, the lightest products, which consist essentially of molecules that contain fewer than three carbon atoms as well as hydrogen gas, are generally sent to the "fuel-gas" network of the refinery and are used as fuel. This fraction, however, contains a non-negligible quantity of hydrogen, which can represent 5–50% mol, typically approximately 20%. It may be advantageous to recover this hydrogen in order to use it in hydroconversion refining units, such as for example the processes for hydrotreatment of gas oil or gasoline, or for example the processes for selective hydrogenation of fractions C2, C3, and C4. These processes are effectively consumers of hydrogen, which is costly to produce (in 2000 it is estimated that the cost of hydrogen was approximately \$1000/ton). The recovery of hydrogen from the FCC effluents, whose value is increased only as a fuel in the "fuel-gas" network, may thus allow the refiner to realize considerable savings.

At the end of this purification stage, a gas is generally obtained that essentially contains ethane, ethylene, methane, hydrogen, nitrogen, and traces of CO, $CO_2$, and COS, which is called FCC dry gas. In most cases this gas is sent to the "fuel-gas" network of the refinery. Upstream from the valve that controls the discharge of the dry gas into the "fuel-gas" network, the pressure is generally between 0.5 and 1.5 MPa typically 1 to 1.2 MPa, and the temperature is between 30 and 100° C., typically 50 to 60° C.

The composition of the dry gas that is produced from the FCC unit basically depends on the operating conditions (starting temperature of the catalyst at the bottom of the reactor, reactor outlet temperature, and the ratio between the mass flow of catalyst and that of the feedstock), the nature of the catalyst and the metals that are optionally present on it, especially nickel, the sizing of the reactor, which may or may not promote catalytic contact or thermal degradation of the products, and the degree of conversion of the hydrocarbon feedstock. For typical cracking conditions (reactor outlet temperature of 510–530° C., ratio between the mass flow of catalyst and that of the feedstock of between 5 and 7, conversion of between 60 and 80%) the dry-gas yield is generally between 1.5 and 5% by weight of the FCC feedstock. This value may be higher, especially if the reactor temperature is higher.

By way of example, on a unit that processes 65,000 barrels of feedstock per day, a dry-gas yield after separation and washing of 3.64% by weight has been observed; this corresponds to an amount of 15.04 t/hour of dry gas. The table below presents the composition of the dry gas after separation and washing.

TABLE 1

Typical Composition of Dry Gas after Discharge into the "Fuel-Gas" Network

| Component | Mass Flow Rate (t/hour) | Molar Flow Rate (kmol/hour) | Mol % |
|---|---|---|---|
| $H_2$ | 0.43 | 215.00 | 27.0 |
| Methane | 3.67 | 229.38 | 29.0 |
| Ethane | 2.75 | 91.67 | 11.6 |
| Ethylene | 3.65 | 130.36 | 16.5 |
| Propane | 0.35 | 7.95 | 1.0 |
| Propylene | 2.16 | 51.43 | 6.5 |
| Isobutane | 0.14 | 2.41 | 0.3 |
| Isobutene | 0.04 | 0.86 | 0.1 |
| n-butenes | 0.04 | 0.71 | 0.1 |
| n-butane | 0.05 | 0.71 | 0.1 |
| CO | 0.07 | 2.50 | 0.3 |
| $CO_2$ | 0.10 | 2.27 | 0.3 |
| $N_2$ | 1.59 | 56.79 | 7.2 |
| Total | 15.04 | 792.04 | 100.0 |

The example of Table 1 shows that in moles the dry gas contains approximately 27 mol % of hydrogen; this represents a mass flow rate of approximately 430 kg/hour.

In this gas there may remain components other than those mentioned in Table 1 in trace form, such as oxygen (10–500 ppm, typically 200 ppm), $H_2S$ (1 to 10 ppm, typically 1 ppm), ammonia (10–500 ppm, typically 100 ppm), $NO_x$ (2–100 ppm, typically 20 ppm), arsine (100–1000 ppb, typically 300 ppb), COS (0.1 to 10 ppm, typically 1 ppm), mercaptans (1 to 500 ppm, typically 10 ppm), and HCN (1 to 10 ppm, typically 2 ppm).

One object of the invention thus consists in recovering hydrogen from the effluents from hydrogen-rich processes, preferably FCC dry gas.

The process of the invention can be defined in that it includes the use of:

a stage (a) in which a hydrocarbon-rich gaseous effluent is brought into contact with the upstream face of a hydrogen-selective membrane at a pressure P1;

a stage (b) in which a flow that contains one or more unsaturated compound(s) is brought into contact with the downstream face of said membrane at a pressure P2, which is smaller than P1, and in the presence of a catalyst, in such a way as to hydrogenate at least a portion of said unsaturated compound(s) using at least a portion of the hydrogen that passes by permeation through said upstream face to said downstream face of said selective membrane; and a stage (c) in which the flow containing the hydrogenated compound(s) in stage (b) is transported away from said downstream face.

DETAILED DESCRIPTION OF THE INVENTION

Figure 1:
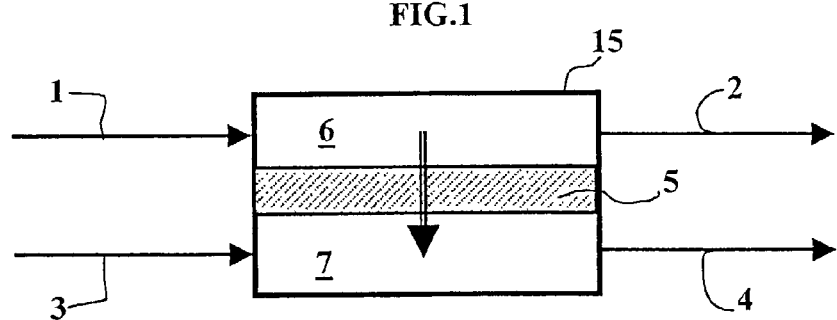
FIG. 1 shows the heart of the invention, which consists in supplying an enclosure with a hydrogen-rich gas that comes from, for example, FCC, such as dry gas.

The membrane-separation techniques used in the process of the invention are generally easy to implement because the permeation units are in most cases modular and compact, operate continuously, and have few if any moving parts; this reduces the need for maintenance, and finally they are relatively energy-efficient. Nevertheless, the investments that they require are tied to the costs of the membrane and the modules. Moreover, in the case of the process according to the invention, the feedstock flows to be treated are generally very large. Thus, for example, in the preferred case of a feedstock that is produced by a fluidized-bed catalytic cracking process, it is common to treat feedstocks whose flow rates are measured in several hundreds of tons per hour. The membranes that can be used in the process according to the invention thus need to be capable of treating such flows while at the same time having adequate hydrogen separation selectivity.

A priori, any kind of membrane can be used in the process according to the invention. Nevertheless, preference will be given to using membranes with very high hydrogen selectivity, such as, for example, inorganic membranes based on palladium and silver, carbon membranes, or even organic membranes, because the inventor has found that these types of membranes can indeed be used to treat high feedstock flows with very good hydrogen separation selectivity and membrane surface areas that are compatible with industrial use, while at the same time making it possible to limit the passage of undesirable compounds such as carbon monoxide and hydrogen sulfide, whereby the latter substances pose the danger that they may limit the activity of the hydrogenation catalyst used in the compartment where the permeate is collected.

Inorganic membranes have the advantage of being highly stable thermally and adequately selective. In the case of hydrogen separation, consideration is mainly given to carbon-fiber based membranes that are marketed by, for example, the company Carbon Membranes Limited of the CLAL group, which are especially well suited for hydrogen separation. These membranes make it possible to obtain, for example, 3000 $m^3$/h of hydrogen from compact units with a footprint of less than 3 $m^2$, under temperature and pressure conditions that lie within the range of, for example, 60 and 120° C., with feedstock pressures very close to 1.6 MPa absolute.

Other membrane materials can be used to advantage, such as, for example, membranes based on microporous silica that are deposited on a porous substrate such as alumina, zeolitic membranes with substrates of porous or metal matrices, or membranes of mixed-oxide type with selective hydrogen transport, or else membranes that contain an alloy of palladium with another metal such as, for example, silver. In particular, membranes of this type that are marketed by Johnson Matthews Limited make it possible to obtain hydrogen flows of about 30 $m^3$/h with a purity of greater than 99.9%. Such commercial membranes have palladium/silver alloy thicknesses on the order of 150 micrometers. Recently, significant progress in reducing the thickness of the separating layer has been made with palladium/silver membranes with substrates of porous ceramic matrices, for example by depositing a metal by non-electrolytic means (referred to as "electroless plating deposition" in English terminology) or else by depositing a thin vapor-phase layer followed by cathode pulverization. In these cases cited, which are not intended to be exhaustive, thickness can be reduced to several micrometers, and the hydrogen flows can thus be increased considerably (whereby the flows are inversely proportional to the thickness of the membrane). Other metallic materials that are under development and/or are being marketed are composed of three successive layers such as: palladium/silver, a permeable metal of group 5 of the Periodic Table (including vanadium, niobium, and tantalum), and palladium/silver. The peripheral palladium/silver layers are very thin (several micrometers), and the intermediate metal layer, which is highly permeable to hydrogen, imparts a very high level of mechanical strength to the material. Here again, hydrogen flows of very high purity can be obtained in this case, and such materials can be used advantageously in the process of the invention.

The inorganic membranes that can be used in the process according to the invention will thus preferably be selected from among the group that consists of: zeolites, membranes based on porous silica and, more particularly, based on microporous silica deposited on a porous substrate, carbon fiber-based membranes, mixed oxides, and metallic membranes that contain a palladium-based alloy.

The organic membranes that can preferably be used in the process according to the invention preferably contain a polymer such as, for example, at least one polymer selected from the group that consists of polyimides, polyaramids, polycarbonates, polysulfones, or polyvinyl fluorides. It is of particular advantage to use polymer-based membranes, especially those based on polyaramids, such as those marketed by the MEDAL Company, or else based on polysulfones on polysiloxane fibers, such as those marketed by MONSANTO.

These organic polyaramid-based membranes make it possible to treat very large hydrogen-containing feedstock flows, for example, 90,000 m$^3$ per hour, and to obtain permeate flows that can vary based on the operating pressures and the temperatures used, for example, on the order of 15,000 m$^3$ per hour. This kind of separation can be accomplished in compact modules that have a footprint of approximately 7 m$^2$. In the preferred case of a feedstock that comes from a fluidized-bed catalytic reactor, relatively compact membrane units can thus treat dry-gas flow rates on the order of, for example, 15,000 m$^3$ per hour. Thanks to the progress that has been made on polyimide and polyaramid membranes, these organic membrane materials can be used to advantage in the process according to the invention at temperatures ranging up to, for example, 180° C. and even 220° C., which makes it possible to achieve optimum permeation/hydrogenation synergy.

The membrane materials can be in the form of, for example, hollow fibers, tubes, or spirals, or they can be flat. Compact systems of the hollow-fiber type and multi-channel systems are preferred, but any geometry may be a priori suitable. Preference will be given to any system that makes it possible to employ large membrane surface areas in compact modules; this makes it possible to treat elevated feedstock flows with a compact system, thereby limiting bulk, investment, and operating costs.

The coupled operating conditions of the membrane-separation stage and hydrogenation stage that are used in the process according to the invention (stages (a) and (b)) are generally as follows:

feed pressure upstream from the membrane: 0.2 to 5 MPa, preferably 0.5 to 2.5 MPa, and more preferably 1 to 1.5 MPa;

permeate pressure (downstream from the membrane): 0.1 to 0.5 MPa, and more preferably 0.2 to 0.4 MPa;

temperature: in the case of an organic membrane, 20 to 180° C., preferably between 70 and 150° C., and more preferably 80–120° C.; or, in the case of inorganic membranes, 20° C. to 280° C., preferably 60° C. to 200°, and more preferably 100 to 200° C.;

hourly volumetric flow rate (VVH) of the flow that contains the compound(s) to be hydrogenated: 0.5 to 30 h$^{-1}$, preferably 2 to 20 h$^{-1}$, relative to the catalyst employed in hydrogenation stage (b).

These conditions are especially compatible with integrated stages of permeation (extraction of hydrogen from the feedstock) and reaction (hydrocarbon-catalyzed hydrogenation) and promote a synergistic separation/reaction coupling by optimizing hydrogen recovery. In the case of FCC hydrogen recovery, the hydrogen-rich effluents can first be heated immediately after coming into contact with the membrane reactor or by heat exchange with the permeator.

With membrane separation, a permeate is thus obtained that consists almost entirely of hydrogen and has very small quantities of hydrocarbons and impurities that are initially present in the feedstock, as well as a retentate that is stripped of hydrogen but contains the bulk of the hydrocarbons and impurities that are initially present in the feedstock. This permeate, mixed with a hydrocarbon feed that preferably contains reactive aromatic molecules, is brought into contact with a catalyst that will promote the hydrogenation reactions under the temperature and overall-pressure conditions that prevail in the downstream compartment (where the hydrogen-rich permeate is circulating). The hydrogen that has passed through the membrane is then consumed in the catalytic-hydrogenation reactions, and the hydrogen flow through the membrane is thereby increased.

The feed of unsaturated organic compounds that is involved in the hydrogenation reaction can also consist of unsaturated molecules other than the aromatic hydrocarbons, such as, for example, acetone or olefins, using suitable catalysts and operating conditions.

Any hydrogenation catalyst that is known to one skilled in the art can be used in hydrogenation stage (b), where the permeate (which contains the hydrogen that has passed through the membrane) is collected. Thus, the metals of group VIII and, more particularly, those of the platinum group can be used in this catalytic section. Multi-metal formations can also be used to advantage. These metals can be deposited on any kind of organic or inorganic substrate. The substrate of the catalyst according to the invention contains, for example, a refractory oxide that is generally selected from among the metal oxides of groups II, III, or IV of the Periodic Table, such as, for example, magnesium oxides, aluminum oxides, silicon oxides, titanium oxides, zirconium oxides, and thorium oxides, either individually, as mixtures, or mixed with other metal oxides of the Periodic Table. It is also possible to use carbon or zeolites (molecular sieves) of the types X, Y, faujasite, mordenite, ZSM-5, ZSM-4, or ZSM-8, whereby these examples are not limiting, as well as mixtures of metal oxides of groups II, III, and/or IV with a zeolitic material.

The catalyst can come in the form of spheres or extrudates and can be brought into contact with the reactive feedstock and the permeate from the membrane section. In a different configuration, the active metal phase can be an integral part of the membrane material. In this latter case, the active (multi)-metal phase will be deposited, by any technique that is known to one skilled in the art, in the separating layer of the membrane.

Depending on the concentrations of contaminants (whereby said concentrations are related to the selectivity of the membrane) and the operating conditions, which are partially determined by the separating zone, it is possible to select the active phase from among the metals of group VIII, used individually or in combination. Nickel or platinum can be advantageously selected based on their hydrogenation performance with regard to aromatic compounds. The catalyst will undergo at least one activation stage, which can be carried out in situ, i.e., in the reaction section, or ex situ, before the catalyst is loaded. The consumption of hydrogen during hydrogenation, for example, of a feedstock (3) moving toward the catalytic reforming unit is especially favorable for the permeation stage because it ensures a sharp reduction of the partial pressure of hydrogen in the permeate. Thus, because the hydrogen partial-pressure differential increases between the feedstock and the permeate, hydrogen permeation is promoted.

The process of the invention can also include a stage (d) in which a reaction is carried out to dehydrogenate the hydrogenated compound(s) transported to stage (c), so as to recover at least a portion of the hydrogen that is consumed by the hydrogenation of stage (b).

It is actually known that there exists a process that produces hydrogen from hydrocarbons. This is the catalytic reforming process, which makes it possible to improve the octane number of naphtha fractions produced by atmospheric distillation. This process is generally fed with light fractions that come mainly from the atmospheric distillation of crude petroleum, whereby they have a boiling point of between, for example, 80 and 180° C., contain limited amounts of aromatic compounds (generally between 5 and 20%, Typically 7 to 15% by volume), and typically contain between 6 and 10 carbon atoms per molecule.

By utilizing in particular the reactions for dehydrogenation of the naphthene compounds, for dehydrocyclization of paraffin compounds, and for isomerization of paraffin and naphthene compounds by means of a catalyst that contains a weakly chlorinated alumina substrate (chlorine content approximately 1% by weight) on which metals such as platinum have been deposited as the main metal, combined in most cases with a second metal such as, for example, rhenium, iridium, tin, or germanium, the catalytic reforming process makes it possible to increase the octane number of gasolines, but also to produce hydrogen. The catalytic reforming processes make it possible to produce hydrogen with yields of typically between 2 and 4% by weight of hydrogen relative to the feedstock of the reforming unit.

The object of the invention is thus, more particularly, a process that includes the hydrogenation of at least a portion of a light fraction that feeds a catalytic reforming process with the dry gases produced in FCC, and does so from hydrogen that is extracted by a selective membrane. This has the advantage of capturing the hydrogen that is produced during FCC in the form of a gaseous hydrocarbon mixture, transporting it in the form of a liquid hydrogenated hydrocarbon, and recovering it in purified form by dehydrogenating the hydrocarbon in the catalytic reforming process.

Hydrocarbon hydrogenation is promoted by the use of catalysts. The aromatic hydrocarbons contained in the feedstocks that feed catalytic reforming (generally containing 6 to 10 carbon atoms) can be hydrogenated under moderate pressure and temperature conditions by using suitable catalysts. Nevertheless, their hydrogenating reactivity is generally less than that of light olefins such as ethylene, which is also present mixed in with the dry gases from FCC, which are then much more difficult to dehydrogenate. The direct hydrogenation of a reforming feedstock in contact with dry gas in the presence of a catalyst would thus inevitably lead to the conversion of ethylene into ethane, which would certainly lead to a loss of 10 to 60% of the hydrogen, and typically 30% of it. Moreover, impurities that are present in the dry gases in trace form, for example $H_2S$, CO, COS, mercaptans, HCN, etc., can act as poisons for the hydrogenation catalysts. The direct hydrogenation of a catalytic reforming feedstock upon contact with dry gas could thus lead to rapid deactivation of the catalyst upon contact with the poisons that are present in the dry gas, even if present in trace form. The originality of this particular aspect of the invention thus consists in separating in an initial stage the hydrogen that is contained in the dry FCC gas by using a hydrogen-selective membrane. The permeation flows through such a membrane depend on the partial pressures of the hydrogen on both sides of the membrane. The consumption of hydrogen after permeation makes it possible to speed up the permeation flows and thus to limit the surface areas that are required for efficiently separating the hydrogen from the other components that make up the dry gas.

The invention is especially applicable to refineries that include an FCC process and a catalytic reforming process, which is the case with the majority of modern refineries.

The invention will be better understood by reading the description given below, in connection with attached FIGS. 1 and 2.

FIG. 1 shows the heart of the invention, which consists in supplying an enclosure (15) with a hydrogen-rich gas (1) that comes from, for example, FCC, such as dry gas. The enclosure is divided into two chambers (6) and (7), which are separated by a membrane (5), which selectively allows the hydrogen to pass from upstream enclosure (6) to downstream enclosure (7), whereby said membrane (5) can be, for example, flat, spiral, or composed of one or more cylinders. Enclosure (7) is fed with a light, essentially liquid hydrocarbon fraction (3) that contains at least four carbon atoms and at most 15 carbon atoms and at least enough aromatic hydrocarbons to absorb by hydrogenation all of the hydrogen that passes through membrane (5); enclosure (7) is at least partially filled with a catalyst that promotes the hydrogenation of the aromatic compounds of fraction (3) at a pressure of 0.1 to 1.5 MPa (absolute) and a temperature of 20 to 280° C. The effluents from compartment (6), i.e., essentially the dry gas minus the bulk of the hydrogen, are evacuated from compartment (6) via line (2), and the effluents from compartment (7), i.e., hydrocarbon fraction (3), which is hydrogenated by reacting with the hydrogen that has passed through membrane (5), are evacuated from compartment (7) via line (4). It should be noted that in FIG. (1), flows (1) and (3), on the one hand, and (2) and (4), on the other hand, circulate in co-current (flow circulating in the same direction). A countercurrent or cross-current configuration could be used equally well.

This process for separation by gaseous permeation can be applied in particular to the separation and extraction of hydrogen. In downstream compartment (7) (according to FIG. 1) of the membrane separation unit, a permeate is collected that contains the hydrogen that has passed through the membrane. In the process according to the invention, downstream compartment (7) also contains catalyst grains, whereby said catalyst promotes hydrogenation reactions. At the outlet from compartment (6) upstream from the permeator, a retentate (2) is obtained that, in the present case, is stripped of hydrogen and contains the bulk of the hydrocarbons and impurities that are initially present in the feedstock. In the process according to the invention, hydrogen recovery is thus achieved in particular by employing a membrane reactor that ensures the coupling of membrane separation and catalytic reaction.

Figure 2:
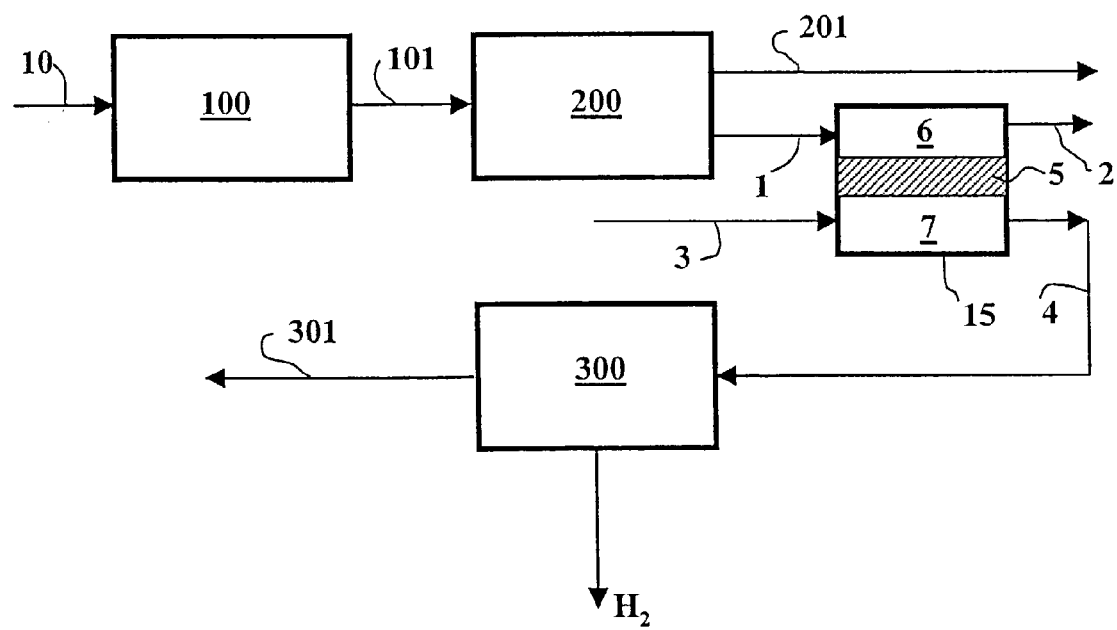
FIG. 2 depicts the implementation of the invention within the framework of a refinery that has an FCC and a catalytic reforming process.

FIG. 2 depicts the implementation of the invention within the framework of a refinery that has an FCC and a catalytic reforming process. FCC feedstock (10) is converted in reaction zone (100) and produces gaseous effluents (101) that are separated into product fractions that contain at least three carbon atoms (201) (LPG, gasoline, etc.) and dry gases (1) in fractionation/purification zone (200). The dry gas feeds enclosure (15) in a compartment (7) that is located upstream from membrane (5), allowing selective permeation of hydrogen. The dry gas, which is stripped of the majority of its hydrogen, is evacuated (2) to the "fuel-gas" network to serve as fuel. Downstream from membrane (5) in compartment (7), enclosure (15) is fed with a naphtha fraction (3), for example obtained at least in part from, for example, the atmospheric distillation of crude petroleum. Said fraction is hydrogenated in compartment (7) in the presence, at least partially, of a catalyst that promotes the hydrogenation of the aromatic compounds of fraction (3) at a pressure of between 0.1 and 1.5 MPa (absolute) and a temperature of between 20 and 280° C. The hydrogenated naphtha is then sent (4) to catalytic reforming process (300), where, by cyclization and dehydrogenation, the octane number of the naphtha is substantially improved, and the naphtha becomes a so-called reformate fraction (301), whereby hydrogen is produced by cyclization and dehydrogenation.

Under the action of pressure differentials, the gaseous-permeation membranes make it possible to separate the gaseous mixtures by selective transfer through a thin and continuous layer of a polymer, a composite material (for example, a polymer charged with mineral crystallites), or through an inorganic material such as a ceramic (a silica, zeolite, mixed oxide, or perovskite membrane, for example) or a carbon membrane, for example, or else a dense metallic material (a palladium and palladium/silver membrane, for example).

This process for separation by gaseous permeation can be used, in particular, to separate and extract hydrogen. In downstream compartment (7) (according to FIG. 1) of the membrane separation unit, a permeate is collected that contains the hydrogen that has passed through the membrane. In the process according to the invention, downstream compartment (7) also contains grains of catalyst, whereby said catalyst promotes hydrogenation reactions. At the outlet from upstream compartment (6) of the permeator, a retentate (2) is obtained which, in the present case, is stripped of hydrogen and contains the bulk of the hydrocarbons and impurities that are initially present in the feedstock. In the process according to the invention, hydrogen recovery is thus achieved in particular by employing a membrane reactor that ensures the coupling of membrane separation and catalytic reaction.

The amount of hydrogen that can be collected in the permeate and its purity depend on several factors, especially the composition of the gas that feeds the membrane-separation unit, the temperature, the feed pressure, the pressure at which the permeate is recovered, the surface area of the membrane used, and thus the geometry of the permeation unit, as well as the permeability and selectivity of the membrane.

In particular, the driving force of permeation is especially high when the pressure differential between the feedstock and the permeate increases. The consumption, via a chemical reaction, of the hydrogen that has passed through the membrane is thus especially favorable for per-membrane transfer because said consumption of hydrogen in the permeate reduces the partial pressure of hydrogen in the latter, thus increasing the pressure differential of hydrogen between the feedstock and the permeate. In this case, it is possible to extract large quantities of hydrogen from a feedstock with a high flow rate. Having hydrocarbon circulate in downstream compartment (7) (where the hydrogen is brought into contact with the hydrogenation catalyst) also especially promotes the transfer of hydrogen because the pressure of hydrogen decreases in this same compartment, which increases the pressure differential between the feedstock and the permeate and thus the driving force of permeation. Said circulation of hydrocarbons (3) in downstream compartment (7) of the permeator can be accomplished both in countercurrent and in co-current relative to the feed that contains the hydrogen to be extracted.

The process described in the invention utilizes in particular the unit where the extraction of hydrogen, which is accomplished by means of a permeable membrane that is selective for hydrogen, is coupled with a chemical reaction, in this particular case catalytic hydrogenation. This coupling of separation and reaction especially promotes both permeation (an increase in the membrane transfer force by consuming the hydrogen that has passed through the membrane) and the catalytic hydrogenation reaction (selective input of hydrogen through the membrane into the catalytic bed). The thus constituted membrane reactor therefore allows synergy between separation and reaction by integrating the two stages, and it provides a substantial improvement in terms of capacity, operating costs, investment, and efficiency (yield, selectivity), particularly compared to a process in which said separation/reaction stages would be decoupled.

It should be noted that the membrane makes it possible to selectively extract hydrogen from a feedstock that contains hydrocarbons and impurities such as CO, COS, and $H_2S$. These molecules (especially CO and $H_2S$) can alter the activity of the catalytic solid that is used to bring about hydrogenation. The integrated membrane-separation operation makes it possible to keep such compounds from being present in the catalytic bed since the membrane, which is highly hydrogen-selective, allows only a negligible proportion of these substances to pass. In the preferred case according to the invention of a feedstock such as dry gas from catalytic cracking in a fluidized bed, these impurities are collected in the retentate (the fraction that has not passed through the membrane) and therefore have no adverse effect in terms of deactivating the catalyst in the compartment in which the permeate circulates.

In cases where the contents of hydrogen sulfide and carbon monoxide are very high, an appropriately adapted, highly hydrogen-selective membrane will be used to extract the hydrogen while preventing these impurities $H_2S$ and CO, which can limit the activity of the hydrogenation catalyst in the permeate, from permeating through. In the case of palladium-based metal membranes, it is generally assumed that maximum $H_2S$ concentrations of 5 ppm and 3% by volume of CO can be tolerated by the metallic membrane material because of the absorption of these molecules at the membrane surface; this may make it necessary to use larger membrane surface areas. If feedstocks contained concentrations of these impurities that exceeded the values cited above, the choice of the membrane material would shift to membranes, for example, of the organic and carbon types in order to ensure a high-performance process and to limit investment in terms of membrane surface areas. Recent progress in improving the stability and selectivity of metallic membranes and future improvements make it possible, nevertheless, to envision utilizing metallic membranes with such feedstocks that have relatively large contents of these impurities.

Another possible option for use with feedstocks that are rich in impurities and do not necessarily come from fluidized-bed catalytic cracking units is to use metallic membranes after a preliminary stage for selective capture of $H_2S$ and CO, for example by preferential adsorption or with a membrane that is permeable to these substances in order to reduce these contents to values that are acceptable for the membrane catalytic reactor. In this latter case, the process remains identical to the preceding description, with $H_2S$ and CO being extracted beforehand.

The following examples illustrate the invention without limiting its scope. In these examples, the hydrogen recovery rate represents the molar ratio between the recovered hydrogen and the hydrogen that is present in the starting dry gas. The VVH corresponds to the hourly volumetric flow rate expressed in $h^{-1}$, calculated as the ratio of the volumetric flow rate of the reforming feedstock to the volume of hydrogenation catalyst.

EXAMPLE 1

In this example, the feedstock to be separated has a typical composition of a dry gas obtained from fluidized-bed catalytic cracking, as indicated in Table 1 that is presented above.

Tubular metallic membranes that contain a layer of a palladium/silver alloy (23% silver), whereby said membranes are arranged coaxially in order to increase the effective surface area of the membrane, are used to carry out separation, which is done at a temperature of 250° C. and an upstream pressure of 1.5 MPa. The pressure downstream from the membrane is 0.2 MPa. The membranes that are used are permeable only to hydrogen, and therefore they are totally selective for separating hydrogen/hydrocarbon and hydrogen/carbon monoxide.

The reforming feedstock that serves as feedstock (feed (3) according to FIG. 1) at the catalytic hydrogenation stage is composed of paraffins (63.55%), naphthenes (22.95%), and aromatic compounds (13.47%) whose distribution by weight by carbon number is presented in Table 2 below:

TABLE 2

Composition of the Hydrocarbon Feedstock

| | Paraffins | Naphthenes | Aromatic Compounds |
|---|---|---|---|
| C6 | 5.49 | 2.3 | 0.41 |
| C7 | 16.83 | 5.8 | 3.18 |
| C8 | 21.38 | 8.27 | 6.8 |
| C9 | 17.26 | 5.95 | 3.08 |
| C10 | 2.59 | 0.63 | — |

The catalytic reforming feedstock is hydrogenated on an Ni catalyst by using the permeate from the metallic membrane, which is permeable only to hydrogen. The catalyst contains 20% Ni in the form of an oxide with a transition aluminum substrate having a specific surface area of 130 $m^2/g$. Said catalyst is activated in advance upon contact with a hydrogen flow at a temperature of 400° C. for 4 hours. The molar composition of the reaction mixture is 18% permeate (containing the hydrogen that has passed through the membrane) and 82% hydrocarbon feed (reforming feedstock). Under these conditions, the hydrogen conversion rate is 99% at VVH=10 $h^{-1}$. The hydrogen recovery rate is 50%.

The hydrogenated naphtha is then sent to the catalytic reforming process in order to release the hydrogen by dehydrogenating the hydrocarbons.

EXAMPLE 2

In this example, the feedstock to be separated has a composition typical of that of Table 1, for a dry gas produced by fluidized-bed catalytic cracking.

During separation, a carbon membrane, which is in the form of hollow fibers and has an elevated specific surface area (a compact system with a membrane surface area/permeator volume ratio of more than 5000 $m^2/m^3$), is carried out at a temperature of 150° C. and an upstream pressure of 1.5 MPa. The pressure downstream from the membrane is 0.3 MPa. The membrane that is used has a hydrogen/hydrocarbon separation selectivity of 450 and a hydrogen/carbon monoxide separation selectivity of 30. The catalytic reforming feedstock is hydrogenated on the same catalyst as in Example 1, using the permeate from the carbon membrane. The molar composition of the reaction mixture is 18% permeate and 82% reforming feedstock, with feed being done in crosscurrent. The permeate resulting from membrane separation mainly contains hydrogen, but also traces of CO and $CO_2$ ($1.7^{E-04}$% mol) and hydrocarbons ($1.4^{E-03}$ mol). Under these conditions, hydrogen conversion is 93% at a VVH of 10 $h^{-1}$. The hydrogen recovery rate is 80% compared to the dry-gas feedstock.

EXAMPLE 3

An organic membrane that contains a polymer such as polyaramid with a high specific surface area is used for separation, which is carried out at a temperature of 90° C. and an upstream pressure of 1.5 MPa. The pressure downstream from the membrane is 0.2 MPa. The membrane that is used has a hydrogen/hydrocarbon separation selectivity and a hydrogen/carbon monoxide separation selectivity of 300 for the selective extraction of 50% of the hydrogen that is present in the feedstock.

The catalytic reforming feedstock is hydrogenated on the same catalyst as in Example 1 by using the permeate from the organic membrane. The molar composition of the reaction mixture is 14% permeate produced by membrane separation and 86% reforming feedstock. The permeate mainly contains hydrogen, but also traces of CO and $CO_2$ ($8.4^{H-06}$% mol), hydrocarbons ($1^{E-03}$ mol), and traces of $H_2S$ ($2.8^{E-09}$ mol). Under these conditions, a conversion rate of 71% is achieved for a VVH of 2 $h^{-1}$. Approximately 75% of the hydrogen contained in the feedstock is recovered.

The preceding examples can be repeated with similar success by substituting the generically or specifically described reactants and/or operating conditions of this invention for those used in the preceding examples.

The entire disclosure of all applications, patents and publications, cited above and below, and of corresponding French Application No. 01/10.481, filed Aug. 3, 2001 is hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A continuous process for recovering hydrogen from a hydrocarbon-rich gaseous effluent, comprising:

a stage (a) in which a hydrocarbon-rich gaseous effluent containing hydrogen is brought into contact with the upstream face of a hydrogen-selective membrane at a pressure P1 said hydrocarbon-rich gaseous effluent being a dry-gas fraction obtained from a process that is selected from the group consisting of fluidized-bed catalytic cracking, steam reforming, catalytic reforming, gasification, partial oxidation, and an autothermal process, that combines reforming and partial oxidation, coking, and visbreaking;

a stage (b) in which a flow that contains one or more unsaturated compound(s) is brought into contact with the downstream face of said membrane at a pressure P2, which is smaller than P1, and in the presence of a catalyst, in such a way as to hydrogenate at least a portion of said unsaturated compound(s) using at least a portion of the hydrogen that passes by permeation through said upstream face to said downstream face of said selective membrane; and a stage (c) in which the flow containing the hydrogenated compound(s) in stage (b) is transported away from said downstream face.

2. A process according to claim 1, wherein said hydrocarbon-rich gaseous effluent containing hydrogen is a dry-gas fraction obtained from fluidized-bed catalytic cracking.

3. A process according to claim 1, wherein the catalyst used in stage (b) comes in the form of spheres or extrudates and contains at least one metal of group VIII deposited on an organic or inorganic substrate, selected from the group of metal oxides consisting of metals from groups II, III, or IV of the Periodic Table of Elements, taken either individually, mixed together, or mixed with other metal oxides of the Periodic Table, carbon, zeolites, and metal oxide mixtures of metals selected from the group consisting of groups II, III, and/or IV with a zeolitic material, and with the provision that a portion of said catalyst is not in contact with said downstream face of said membrane.

4. A process according to claim 1, wherein the active metal phase of the catalyst that is used in stage (b) and that contains at least one metal of group VIII is an integral part of the membrane material.

5. A process according to claim 3, wherein the active phase of the catalyst used in stage (b) contains nickel or platinum, either alone or in combination.

6. A process according to claim 1, wherein the operating conditions of stages (a) and (b) include a feed pressure upstream from the membrane of 0.2 to 5 MPa and a pressure of the permeate downstream from the membrane of 0.1 to 0.5 MPa.

7. A process according to claim 1, wherein the hourly volumetric flow rate (VVH) of the flow that contains the unsaturated compound(s) to be hydrogenated in stage (b) is 0.5–30 $h^{-1}$ relative to the hydrogenation catalyst.

8. A process according to claim 1, wherein said membrane is an inorganic or metallic membrane.

9. A process according to claim 8, wherein said membrane is selected from the group consisting of carbon fiber-based membranes, membranes based on microporous silica deposited on a porous substrate, zeolitic membranes on a substrate composed of porous or metallic matrices, mixed-oxide membranes with selective hydrogen transport, and membranes that include an alloy of palladium with another metal.

10. A process according to claim 8, wherein said membrane is inorganic or metallic membrane and the temperature at stage (b) is 20 to 280° C.

11. A process according to claim 1, wherein said membrane is an organic membrane.

12. A process according to claim 11, wherein said organic membrane contains a polymer that is selected from the group consisting of polyimides, polyaramids, polycarbonates, polysulfones, and polyvinyl fluorides.

13. A process according to claim 11, wherein an organic membrane is used and the temperature at stage (b) is 20 to 180° C.

14. A process according to claim 1, wherein the feedstock that is treated is rich in $H_2S$, CO or both impurities and wherein the process further comprises a preliminary stage for selective capture of $H_2S$, CO or both.

15. A process according to claim 14, wherein the selective capture of $H_2S$, CO or both is accomplished by preferential adsorption.

16. A process according to claim 14, wherein the selective capture of $H_2S$, CO or both is accomplished with a membrane that is permeable to $H_2S$, CO or both.

17. A process according to claim 1, said process further comprising a stage (d) comprising dehydrogenating the transported hydrogenated compound(s) in stage (c), so as to recover at least a portion of the hydrogen that is consumed by the hydrogenation of stage (b).

18. A process according to claim 17, wherein the flow that is caused to circulate upon contact with the downstream face of said membrane in stage (b) contains one or more aromatic hydrocarbons(s), and the hydrogenation reaction of stage (d) is a reforming reaction.

19. A process according to claim 18, wherein the flow that is caused to circulate on contact with the downstream face of said membrane in stage (b) is a naphtha fraction from atmospheric distillation.

20. A process according to claim 17, wherein said hydrocarbon-rich gaseous effluent containing hydrogen is a dry-gas fraction obtained from fluidized-bed catalytic cracking.

21. A process according to claim 18, wherein said hydrocarbon-rich gaseous effluent containing hydrogen is a dry-gas fraction obtained from fluidized-bed catalytic cracking.

22. A process according to claim 19, wherein said hydrocarbon-rich gaseous effluent containing hydrogen is a dry-gas fraction obtained from fluidized-bed catalytic cracking.

23. A process according to claim 1, wherein said membrane is a carbon membrane, a silica-based membrane, a zeolitic membrane or a mixed oxide membrane.

24. A process according to claim 12, wherein the organic membrane is a polyamide membrane.

25. A process according to claim 3, wherein said membrane is an organic membrane, a carbon membrane, a silica-based membrane, a zeolitic membrane or a mixed oxide membrane.

26. A process according to claim 19, further comprising passing the hydrogenated naphtha fraction to a reforming reaction so as to decompose the hydrogenated naphtha fraction into hydrogen and unsaturated compounds, and recovering the hydrogen.

* * * * *